United States Patent
Zhao et al.

(10) Patent No.: US 10,705,824 B2
(45) Date of Patent: Jul. 7, 2020

(54) INTENTION-BASED COMMAND OPTIMIZATION

(71) Applicant: INTERNATIONAL BUSINESS MACHINES CORPORATION, Armonk, NY (US)

(72) Inventors: Rong Zhao, Beijing (CN); Ke Zhang, Beijing (CN); Li Quan Cui, Changchun (CN); Zhuo Zhao, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 16/125,943

(22) Filed: Sep. 10, 2018

(65) Prior Publication Data

US 2020/0081700 A1  Mar. 12, 2020

(51) Int. Cl.
| | | |
|---|---|---|
| G06F 9/44 | (2018.01) | |
| G06F 8/65 | (2018.01) | |
| G06F 8/71 | (2018.01) | |
| G06F 9/54 | (2006.01) | |
| G06F 9/455 | (2018.01) | |
| H04L 29/08 | (2006.01) | |
| G06F 8/30 | (2018.01) | |

(52) U.S. Cl.
CPC .............. *G06F 8/65* (2013.01); *G06F 8/316* (2013.01); *G06F 8/71* (2013.01); *G06F 9/45512* (2013.01); *G06F 9/542* (2013.01); *H04L 67/10* (2013.01)

(58) Field of Classification Search
CPC ... G06F 8/316; G06F 8/65; G06F 8/71; G06F 9/45512; G06F 9/542; H04L 67/10
USPC ........................................................ 717/121
See application file for complete search history.

(56) References Cited

U.S. PATENT DOCUMENTS

| | | | |
|---|---|---|---|
| 8,010,578 B2 | 8/2011 | Laflen et al. | |
| 8,364,690 B2* | 1/2013 | Gonzalez | G06F 11/0709 |
| | | | 707/758 |
| 9,064,057 B2 | 6/2015 | Shen et al. | |
| 9,483,250 B2 | 11/2016 | Eilam et al. | |
| 9,606,900 B1 | 3/2017 | Pradhan et al. | |
| 9,619,373 B2 | 4/2017 | Alexander et al. | |
| 9,632,769 B2 | 4/2017 | Arnott et al. | |
| 10,394,862 B2* | 8/2019 | Song | G06F 16/951 |

(Continued)

FOREIGN PATENT DOCUMENTS

CN   105262726 A   1/2016

OTHER PUBLICATIONS

Philip McCarthy, "Search RDF data with SPARQL", 2005, retrieved from IBM DeveloperWorks, 10 pages (Year: 2005).*

(Continued)

*Primary Examiner* — Ted T. Vo
(74) *Attorney, Agent, or Firm* — Rakesh Roy

(57) ABSTRACT

This disclosure provides a method, a computing system and a computer program product for optimizing computer-readable commands. The method includes detecting an intention of a set of commands based on a semantic model. The semantic model represents the set of commands and contexts of execution of the set of commands. The method further includes obtaining a predetermined semantic sub-model associated with the intention and updating the semantic model with the predetermined semantic sub-model. The method further includes generating a script of commands based on the updated semantic model.

13 Claims, 9 Drawing Sheets

(56) References Cited

U.S. PATENT DOCUMENTS

2010/0250577 A1* 9/2010 Cao .................. G06F 16/24534
707/760
2016/0267133 A1* 9/2016 Briggs .............. G06F 16/24542

OTHER PUBLICATIONS

DuCharme, "Getting started with SPARQL Update", 2011, a bobdc. blog, 3 pages (Year: 2011).*
Lopez de Vergara et al., "A Semantic Web Approach to Share Alerts among Security Information Management Systems", 2010, Springer-Verlag, pp. 27-38 (Year: 2010).*
W3C, "SPARQL 1.1 Update", 2013, retrieved from https://www.w3.org/TR/sparql11-update/, 32 pages (Year: 2013).*
Daniel et al., "Automated GUI refactoring and test script repair", Published in: ETSE '11 Proceedings of the First International Workshop on End-to-End Test Script Engineering pp. 38-41, Accessed on Jun. 29, 2017, Abstract, 2 pages.
Thummalapenta et al., "Automating test automation", Published in: Software Engineering (ICSE), 2012 34th International Conference on, Date of Conference: Jun. 2-9, 2012, IEEE, Abstract, 3 pages.
Mell et al., "The NIST Definition of Cloud Computing", Recommendations of the National Institute of Standards and Technology, Special Publication 800-145, Sep. 2011, 7 pages.

* cited by examiner

INTENTION-BASED COMMAND OPTIMIZATION

BACKGROUND

The present invention relates to software development, and more specifically, to optimization of computer-readable commands.

In software testing, verification, installation or deployment, software developers or operators often need to perform the same task multiple times, perhaps in different environments, such as testing, staging and production environments. Usually a series of operations are required to perform a task. These operations may be performed by manually inputting commands or by running an automation script containing the commands. It is common that the commands may contain wrong, useless, redundant or non-optimal steps, or miss key steps. In addition, it may be required that the commands should comply with certain security rules, enterprise standards or industrial standards. The software developers or operators usually perform manual analysis and security scan on the commands to ensure the correctness and compliance, which may be time-consuming and difficult.

SUMMARY

Disclosed herein are embodiments of a method, computing system and computer program product for optimizing computer-readable commands.

According to one embodiment of the present invention, there is provided a computer-implemented method for command optimization. The method includes detecting an intention of a set of commands based on a semantic model. The semantic model represents the set of commands and contexts of execution of the set of commands. The method further includes obtaining a predetermined semantic sub-model associated with the intention and updating the semantic model with the predetermined semantic sub-model. The method further includes generating a script of commands based on the updated semantic model.

According to another embodiment of the present invention, there is provided a computing system for command optimization, which comprises one or more processors and a computer-readable memory unit coupled to the one or more processors. The memory unit includes instructions that when executed by the one or more processors perform actions of: detecting an intention of a set of commands based on a semantic model, wherein the semantic model represents the set of commands and contexts of execution of the set of commands; obtaining a predetermined semantic sub-model associated with the intention; updating the semantic model with the predetermined semantic sub-model; and generating a script of commands based on the updated semantic model.

According to a further embodiment of the present invention, there is provided a computer program product for command optimization, which comprises a computer readable storage medium having program instructions embodied therewith. The program instructions are executable by one or more processors to cause the one or more processors to perform actions of: detecting an intention of a set of commands based on a semantic model, wherein the semantic model represents the set of commands and contexts of execution of the set of commands; obtaining a predetermined semantic sub-model associated with the intention; updating the semantic model with the predetermined semantic sub-model; and generating a script of commands based on the updated semantic model.

BRIEF DESCRIPTION OF THE DRAWINGS

Through the more detailed description of some embodiments of the present disclosure in the accompanying drawings, the above and other objects, features and advantages of the present disclosure will become more apparent, wherein the same reference generally refers to the same components in the embodiments of the present disclosure.

DETAILED DESCRIPTION

Figure 1:
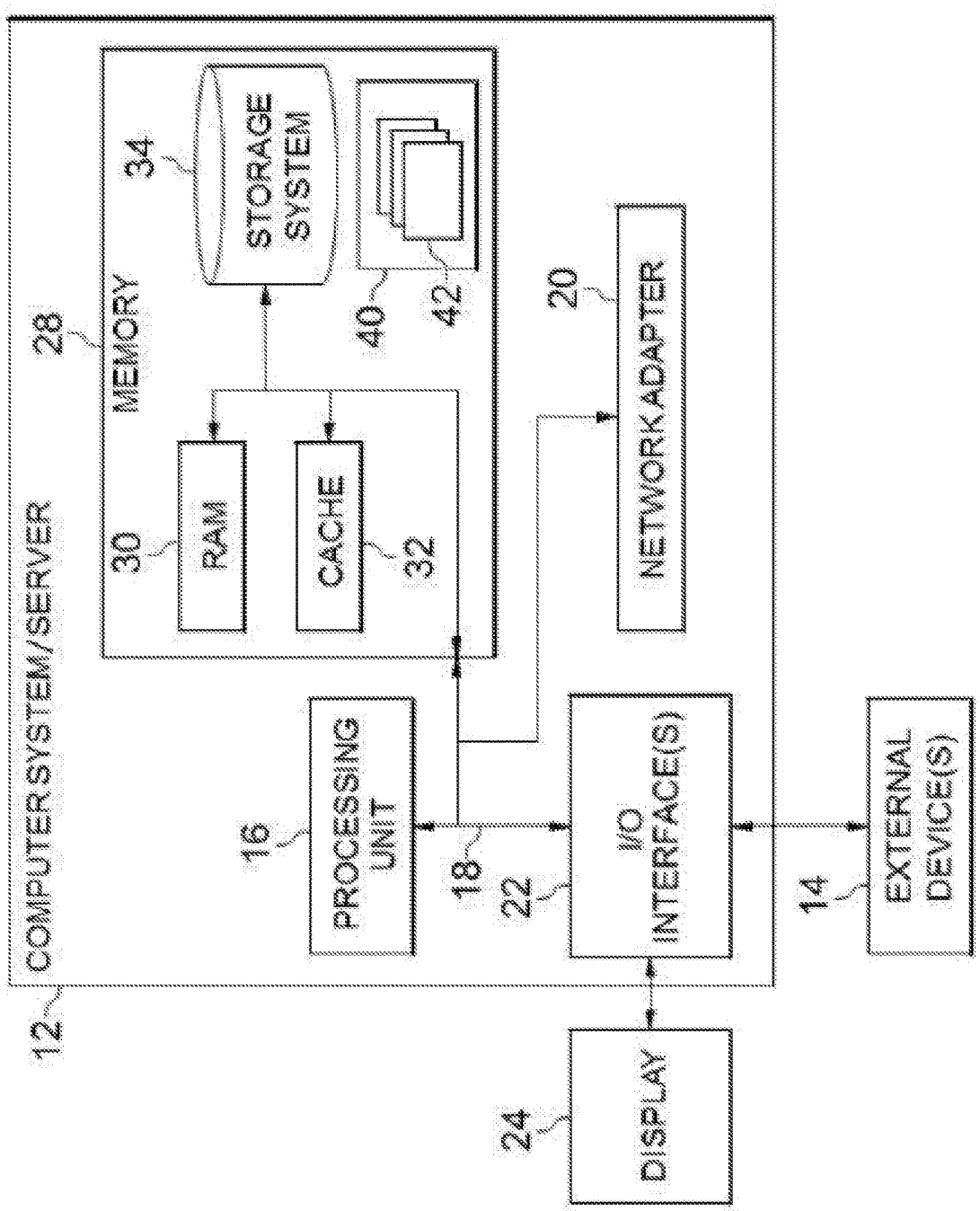
FIG. 1 depicts a cloud computing node according to an embodiment of the present invention.

Some preferable embodiments will be described in more detail with reference to the accompanying drawings, in which the preferable embodiments of the present disclosure have been illustrated. However, the present disclosure can be implemented in various manners, and thus should not be construed to be limited to the embodiments disclosed herein.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12 or a portable electronic device such as a communication device, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
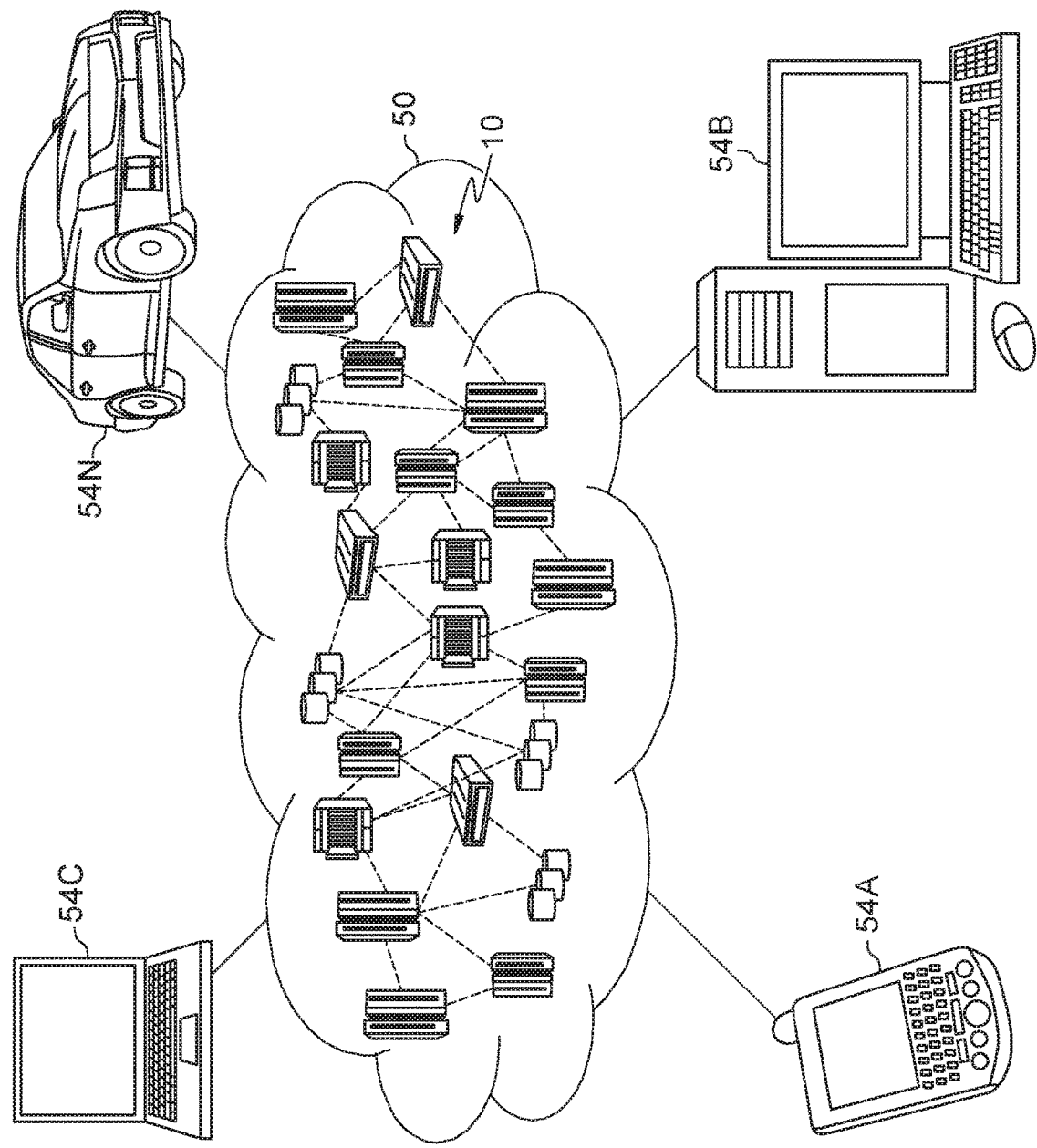
FIG. 2 depicts a cloud computing environment according to an embodiment of the present invention.

Referring now to FIG. 2, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
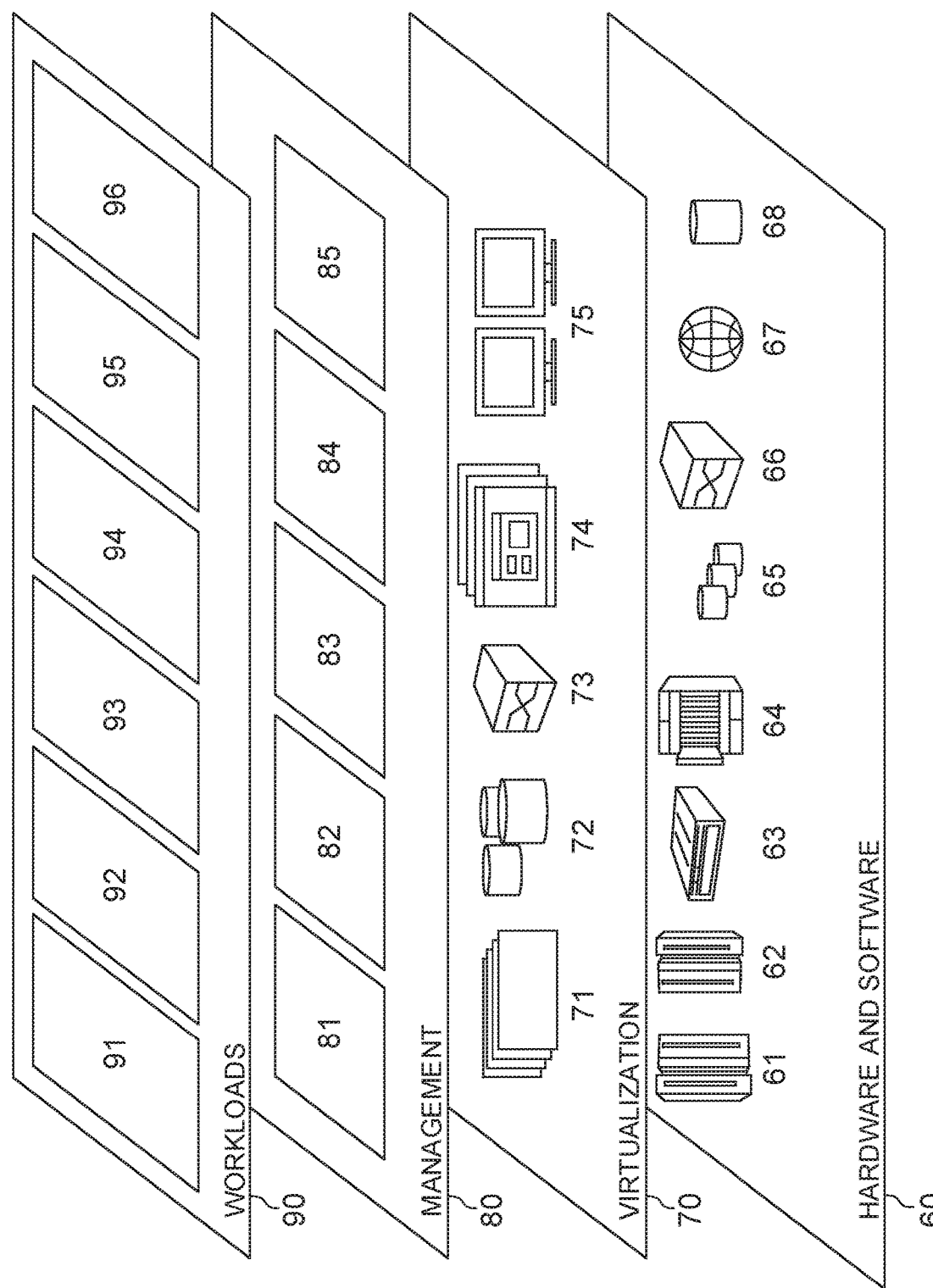
FIG. 3 depicts abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below.

Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and computer-readable command optimization 96.

As mentioned above, in software testing, verification, installation or deployment, software developers or operators often need to perform a task by manually inputting commands or by running an automation script containing the commands. However, the commands may contain wrong, useless, redundant or non-optimal steps, or miss key steps. Therefore, there is a need for automatically optimizing the commands.

Figure 4:
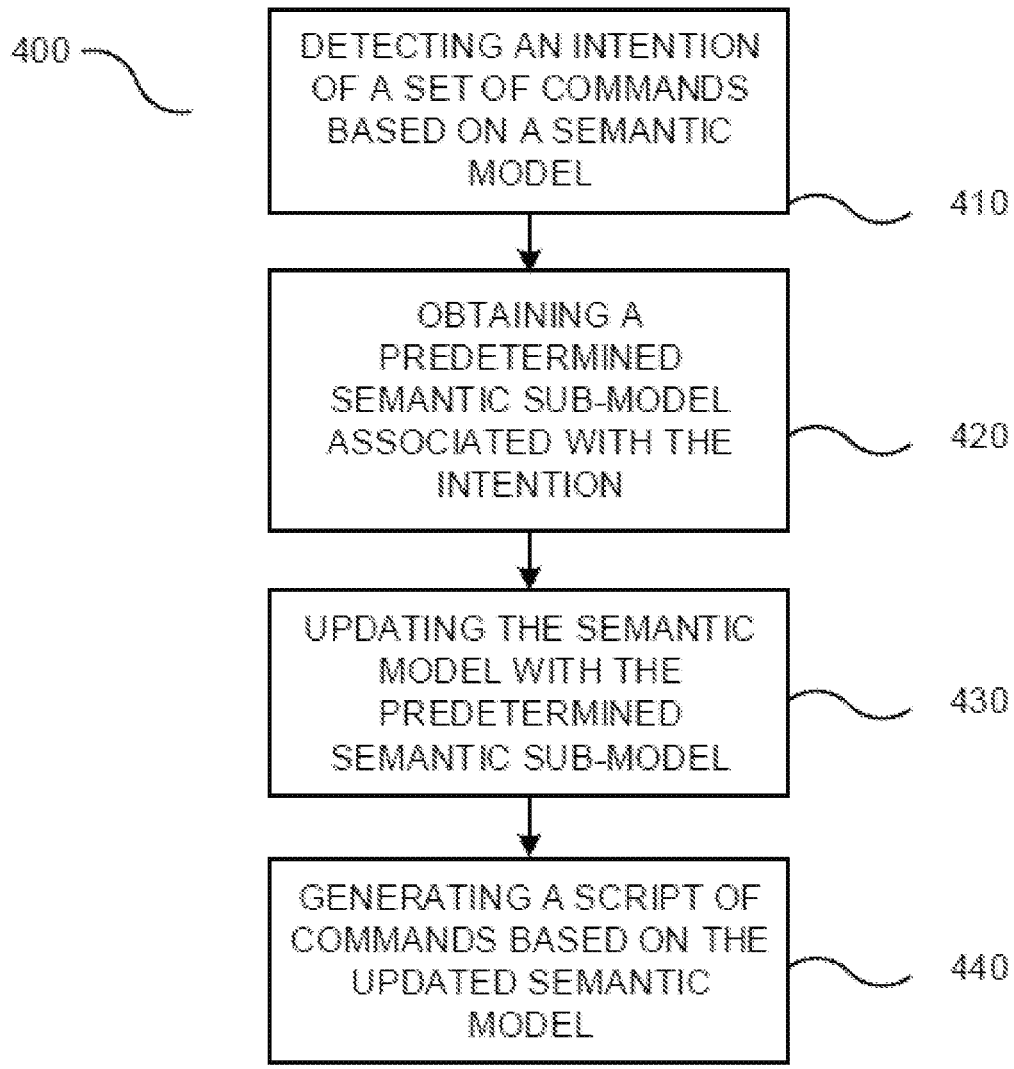
FIG. 4 is a flowchart illustrating an exemplary method for optimizing computer-readable commands according to an embodiment of the present invention.

FIG. 4 is a flow chart showing an exemplary computer-implemented method 400 for optimizing computer-readable commands according to an embodiment of the present invention. It would be appreciated that, the method 400 can be implemented in various systems, such as the computer system/server 12 in FIG. 1, or the cloud computing environment 50 in FIG. 2.

At block 410, an intention of a set of commands may be detected based on a semantic model, wherein the semantic model may represent the set of commands and contexts of execution of the set of commands. Just for example, the set of commands may be commands inputted by an operator to perform a task during, e.g., software testing, and the intention may be changing the system configuration, moving a file from one directory to another directory, etc.

The contexts of execution of a command may include, but not limited to, at least one of: syntax of the command, input of the command, output of the command, environment variables of the command, arguments of the command, exit code of the command, the user running the command, file changed by the command, process changed by the command, environment variables changed by the command, etc.

According to an embodiment, the semantic model may comprise a plurality of nodes and relationships between the nodes, and the plurality of nodes may comprise command nodes and context nodes. Each command node may correspond to a command in the set of commands. The content of a command node may be the operation of the corresponding command. For example, for a command node corresponding to the changing directory command "cd documents", its content is "cd". A context node and its relationship with a command node may represent a context of execution of the corresponding command, and a relationship between command nodes may represent a sequential dependency between the corresponding commands. The relationships between the nodes may have various types. For example, there may be an "after" relationship between two command nodes, indicating that one command node is performed after the other command node. As another example, there may be an "arg" relationship between a command node and a context node, indicating that the context node is an argument of the command node. As yet another example, there may be a "stdout" relationship between a command node and a context node, indicating that the context node is a standard output of the command node. The content of a context node may be the content or value of the corresponding context. For example, the content of a context node may be the value of the argument (for the "arg" relationship), or the output content (for the "stdout" relationship). More details will be described with reference to FIG. 6.

It should be noted that, two or more command nodes may link to (i.e., have relationships with) the same context node, such as the case where two command nodes have the same argument, or the case where two command nodes operate on the same object (e.g., the same file, process, or environment variable). On the other hand, a command node may link to one or more context nodes, depending on the contexts of execution of the command. Moreover, a command node may link to one or more other command nodes, depending on their sequential dependencies.

It should also be noted that, the semantic model is not limited to the above example and may have other structures to represent the set of commands and the contexts thereof.

According to an embodiment, the semantic model may be represented by a plurality of triples, and each triple may include three parts: a subject node, an object node and a relationship between the subject node and the object node. For example, if a command "A" has an argument "a", the corresponding nodes and their relationship in the semantic model can be represented by a triple (A arg a). As another example, if a command "B" is performed after a command 'B", the corresponding nodes and their relationship may be represented by a triple (B after A). It would be appreciated that any appropriate data structure may be used to represent the semantic model.

According to an embodiment, the intention may be detected by determining that at least part of the nodes and their relationships match a predetermined intention schema corresponding to the intention. The intention schema may include one or more rules to be satisfied for a semantic model to reflect the intention. The rules may be that, for example, a command node involves a particular operation (e.g., a "cat" operation for printing content of a file on the standard output), there is a particular type of relationship between two nodes (e.g., one command node is executed after the other command node, or one context node is a standard output of the other command node), etc.

At block 420, a predetermined semantic sub-model associated with the intention may be obtained. The semantic sub-model may correspond to an optimized set of commands for realizing the detected intention. According to an embodiment, the semantic sub-model and/or the optimized set of commands associated with the intention may be predetermined by experienced programmers according to the intention and may have been stored in association with the intention schema.

At block 430, the semantic model may be updated with the predetermined semantic sub-model associated with the intention. For example, the nodes and their relationships matching the predetermined intention schema may be replaced with the nodes and relationships in the semantic sub-model. Since the semantic sub-model may correspond to an optimized set of commands for realizing the detected intention, the updating of the semantic model may represent an optimization of the original set of commands. For example, in the updated semantic model, some useless nodes may be removed and/or some wrong nodes may be corrected.

According to an embodiment, the detection of intention at block 410 and the updating of semantic model at block 430 may be iteratively performed until a certain condition is met. For example, different parts in the command set may have different intentions. In each iteration, a different intention may be detected and the semantic model may be updated accordingly. The iteration may continue until no predetermined intention schema is matched.

At block 440, a script of commands may be generated based on the updated semantic model obtained at block 430. The script may be an updated set of commands corresponding to the updated semantic model. In an embodiment, the script may be an automation script for use in, e.g., a testing, staging or production environment for a software or a service.

The script of commands generated at block 440 can be used to perform the same task as the original set of commands with a better performance, because some original commands have been replaced by an optimized (e.g., more concise and/or efficient) set of commands for the same intention. It is especially useful if the same task needs to be performed multiple times. For example, a SaaS operator may need to do initial installation and deployment in the SaaS staging environment and then perform the same task in the SaaS production environment. In such a case, the commands applied in the SaaS staging environment and the contexts of execution of these commands can be collected, and the commands can be improved using method 400, such that the operator can use the improved commands in the SaaS production environment to realize the same intention.

More details about method 400 will be illustrated in connection with FIGS. 5-9.

Figure 5:
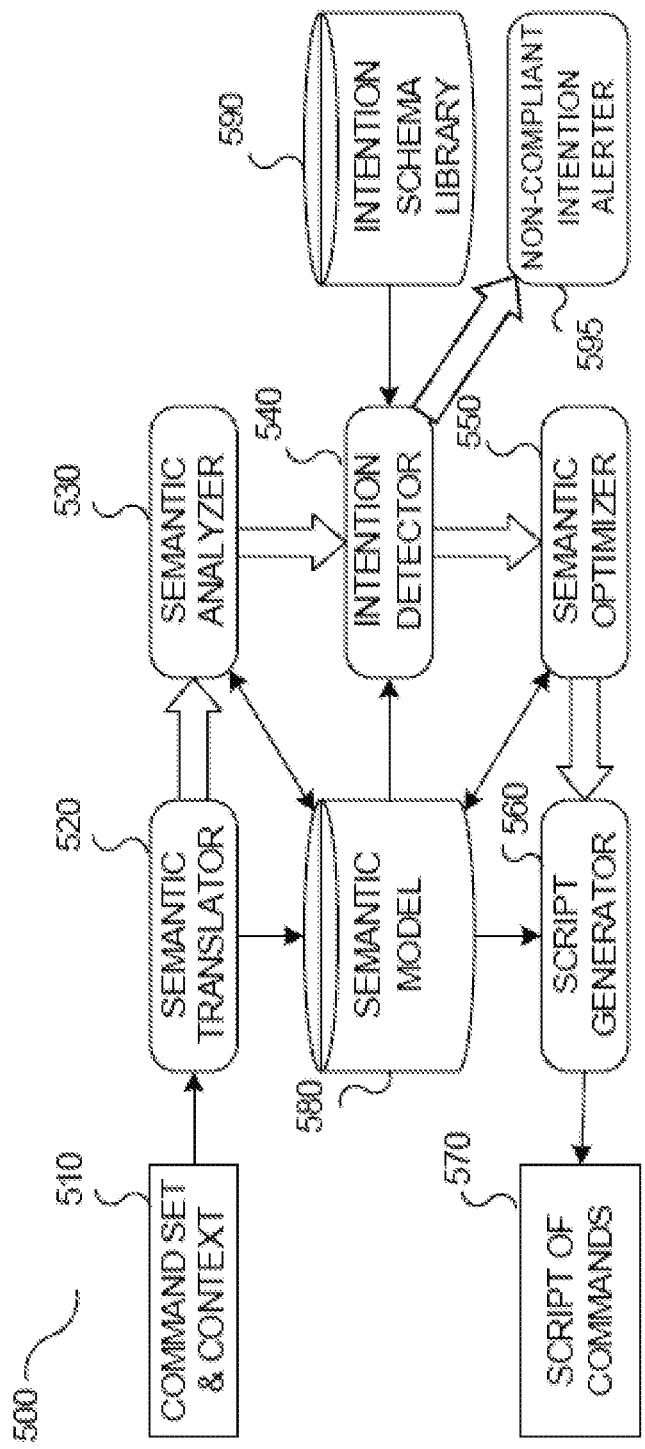
FIG. 5 is a block diagram illustrating an exemplary system for optimizing computer-readable commands according to an embodiment of the present invention.

FIG. 5 is a block diagram illustrating an exemplary system 500 for optimizing commands according to an embodiment of the present invention. In FIG. 5, the rounded rectangles denote processing logics, and the rectangles denote data or artifacts of the processing. It would be appreciated that, any one of the processing logics may be implemented by software (such as software running on a general-purpose computer or a dedicated computer), hardware (circuitry, dedicated chip, etc.), or a combination of both. For example, the processing logics in FIG. 5 may be implemented as software running on the computer system/server 12 of FIG. 1.

With reference to FIG. 5, the exemplary system 500 may comprise a semantic creator 530, an intention detector 540, a semantic optimizer 550, a script generator 560 and a non-compliant intention alerter 595.

A set of commands 510 may be fed into the semantic creator 530. The contexts of execution of the set of commands 510 may also be fed into the semantic creator 530. The set of commands 510 may be obtained in various ways. For example, it may be entered by a user (e.g., via Input/Output (I/O) interfaces 22) and recorded by system tools in the background, or may come from a script stored in the system memory, or may be retrieved by accessing log files. The contexts of execution of the commands may also be collected in various ways. For example, they can be recorded by system tools during the execution of the commands, or be retrieved by accessing log files. In some embodiments of the invention, the set of commands 510 are commands executed in a testing environment, a staging environment or a production environment of a software or a service.

The semantic creator 530 may be configured to establish a semantic model 580 based on the set of commands 510 and the corresponding contexts.

In particular, the semantic creator 530 may translate each command in the set of commands 510 and the contexts of execution of the command into a set of nodes and relationships, including a command node, one or more context nodes and relationships between the command node and the context nodes. The semantic creator 530 may also translate the execution sequence of the commands into direct "after" relationships between the command nodes. Each of the direct "after" relationships may exist between two command nodes corresponding to two adjacent commands.

The semantic creator 530 may further derive the indirect "after" relationships between the command nodes corresponding to non-adjacent commands, based on the direct "after" relationships. As a simple example, a command set comprising three sequential commands "A", "B" and "C" may be translated by the semantic creator 530 into three command nodes "A", "B", "C", a direct "after" relationship between "A" and "B", and another direct "after" relationship between "B" and "C". The semantic creator 530 may also derive an indirect "after" relationship between "A" and "C" based on the two direct "after" relationships. It should be noted that the determination of "after" relationships between the command nodes is not limited to the above example. The semantic creator 530 may also directly determine both the direct and indirect "after" relationships based on the execution sequence of the commands.

The semantic creator 530 may be further configured to combine context nodes having the same content in the semantic model 580. This may help simplify the model and better reflect the relationships between the nodes. For example, if a command node "A" links to a context node "a" with an "arg" relationship, a command node "B" links to a context node "b" with an "arg" relationship, and the context node "a" has the same content, e.g., a string "hello", as the context node "b", then the two initial triples (A arg a) and (B arg b) may become (A arg a) and (B arg a) after the combination, indicating that the two command nodes "A" and "B" have the same argument. It should be noted that, although it is preferable to combine the context nodes having the same content, this is not necessarily required for the detection of intention. For example, if no combination of the context nodes is made, then the comparison of contents of context nodes may be performed in determining the existence of match with a predetermined intention schema. In addition, if the context nodes are already stored as constants (e.g., the string "hello") instead of variables, then the initial triples are (A arg "hello") and (B arg "hello"), and the combination of context nodes have been inherently done.

The intention detector 540 may be configured to detect the intention of the command set 510 based on the semantic model 580. According to an embodiment, the intention detector 540 may determine whether one or more nodes and their relationships in the semantic model 580 match a predetermined intention schema in the intention schema library 590. The intention schema library 590 may contain various predetermined intention schemas corresponding to different intentions. Moreover, as different operators may input different non-optimal sets of commands for the same intention, the intention schema library 590 may contain different intention schemas corresponding to the same intention, so as to match different non-optimal semantic models. As mentioned above, each intention schema may comprise one or more rules to be satisfied for a semantic model to reflect a corresponding intention. In an embodiment of the invention, an intention schema may contain a minimum set of rules that are necessary for reflecting the intention. The intention detector 540 may determine that the one or more nodes and their relationships match a predetermined intention schema if all the rules in the intention schema are satisfied. The predetermined intention schemas in the intention schema library 590 may be automatically generated by analyzing the history of command execution or may be written by programmers according to their experiences. The determination of the match of the nodes and their relationships in the semantic model 580 with the predetermined intention schema may be realized by various semantic query technologies, such as SparQL (Simple Protocol and RDF (Resource Description Framework) Query Language).

In response to determining that one or more nodes and their relationships in the semantic model 580 match a predetermined intention schema in the intention schema library 590, the semantic optimizer 550 may update the semantic model 580 with a predetermined semantic sub-model associated with the matched intention schema. For example, the one or more nodes and their relationships matching the intention schema may be replaced with the nodes and relationships in the semantic sub-model. The semantic sub-model may correspond to an optimized set of commands for realizing the detected intention. For example, the optimized set of commands may be a set of commands that are very concise and/or well comply with a predetermined security standard. In an embodiment, the predetermined semantic sub-model and the optimized set of commands may both have been stored in association with the corresponding intention schema. Alternatively, the predetermined semantic sub-model may have been stored in association with the corresponding intention schema, while the optimized set of commands may be derived from the semantic sub-model.

In an embodiment, the operations by the intention detector 540 and the semantic optimizer 550 may be performed in an iterative way, until the updated semantic model 580 does not match any intention schema in the intention schema library 590. According to an embodiment, for each intention schema in the library 590, it is determined whether there exist some nodes and their relationships in the semantic model 580 that match this intention schema. If yes, then the semantic model 580 is updated with a predetermined semantic sub-model, and the operation proceeds to the next intention schema in the library 590. If not, then the semantic model 580 is not updated and the operation proceeds to the next intention schema. The operation can be iteratively performed until no match is found for any intention schema in the library 590. It would be appreciated that, other appropriate criteria for terminating the iteration may also be used. For example, the iteration may be terminated if a certain period of time has elapsed, the size of the set of commands is below a threshold, and/or the like. With the progress of the iteration, the semantic model may be gradually updated, and finally, an optimized semantic model with the best possible performance can be obtained.

The script generator 560 may generate a script of commands 570 based on the updated semantic model. The script generator 560 may generate a script each time the semantic model 580 is updated, or may not generate the script until the semantic model 580 is finally optimized after a number of iterations. In an embodiment, the script generator 560 may directly translate the updated semantic model 580 into a set of commands. In another embodiment, the script generator 560 may simply replace the commands corresponding to an intention with an optimized set of commands corresponding to the same intention.

In an embodiment of the invention, an alert may be output in response to detecting a dangerous intention. In particular, in the case where one or more nodes and their relationships match an intention schema that relates to an intention not in compliance with a predetermined security standard, the non-compliant intention alerter 595 may output an alert, e.g., to the user or to the manager. In addition, the commands corresponding to the dangerous intention may be deleted or replaced with a predetermined set of secure commands. It would be appreciated that any other appropriate actions may be performed in response to detecting a particular intention.

With reference to FIGS. 6-9, an exemplary process of optimizing commands will be described in more detail by taking the following set of Linux commands as an example:
1: >su-dbuser
2: >cd sqllib
3: >cat dbnodes.cfg
4: env-test01-db
5: >hostname-s
6: env-stag01-db
7: >vi dbnodes.cfg
8: >cat dbnodes.cfg
9: env-stag01-db In the set of commands listed above, a line started with ">" represents a command entered by a user, and a line without ">" represents a standard output, which can be regarded as a context of execution of the related command. Specifically, line 1 denotes a command "su" for switching the current user (e.g., "admin") to "dbuser" and switching the working environment (e.g., the environmental directory) accordingly. Line 2 denotes a command "cd" for changing the current environmental directory "/home/dbuser" to "/home/dbuser/sqllib". In line 3, "cat" is a command for printing content of a file on the standard output (e.g., displaying the file content onto the screen), and thus in line 4, the content of the configuration file "dbnodes.cfg" is shown on the screen, which is "env-test01-db". This may, for example, indicate that the current configuration is in a testing environment. Line 5 denotes a command "hostname" with an argument "-s" for querying the short hostname, and in line 6, the answer "env-stag01-db" is shown. Line 7 denotes a command "vi" for editing the file "dbnodes.cfg" using the vi editor. In the vi editor (not shown), the user may manually edit the file "dbnodes.cfg" to change its content from "env-test01-db" to "env-stag01-db", in order to be in line with the current hostname. Line 8 denotes a command "cat" again for printing the content of the file "dbnodes.cfg". In line 9, the content of the configuration file "dbnodes.cfg" is shown, which has been changed to "env-stag01-db". This may, for example indicate that the current configuration is in a staging environment. In general, the above commands intend to adapt a configuration file to the current hostname.

FIGS. 6-9 show graphical representations of semantic models for illustration. It should be noted that the data structures of the semantic models may take a variety of forms, not limited to any specific form.

Figure 6:
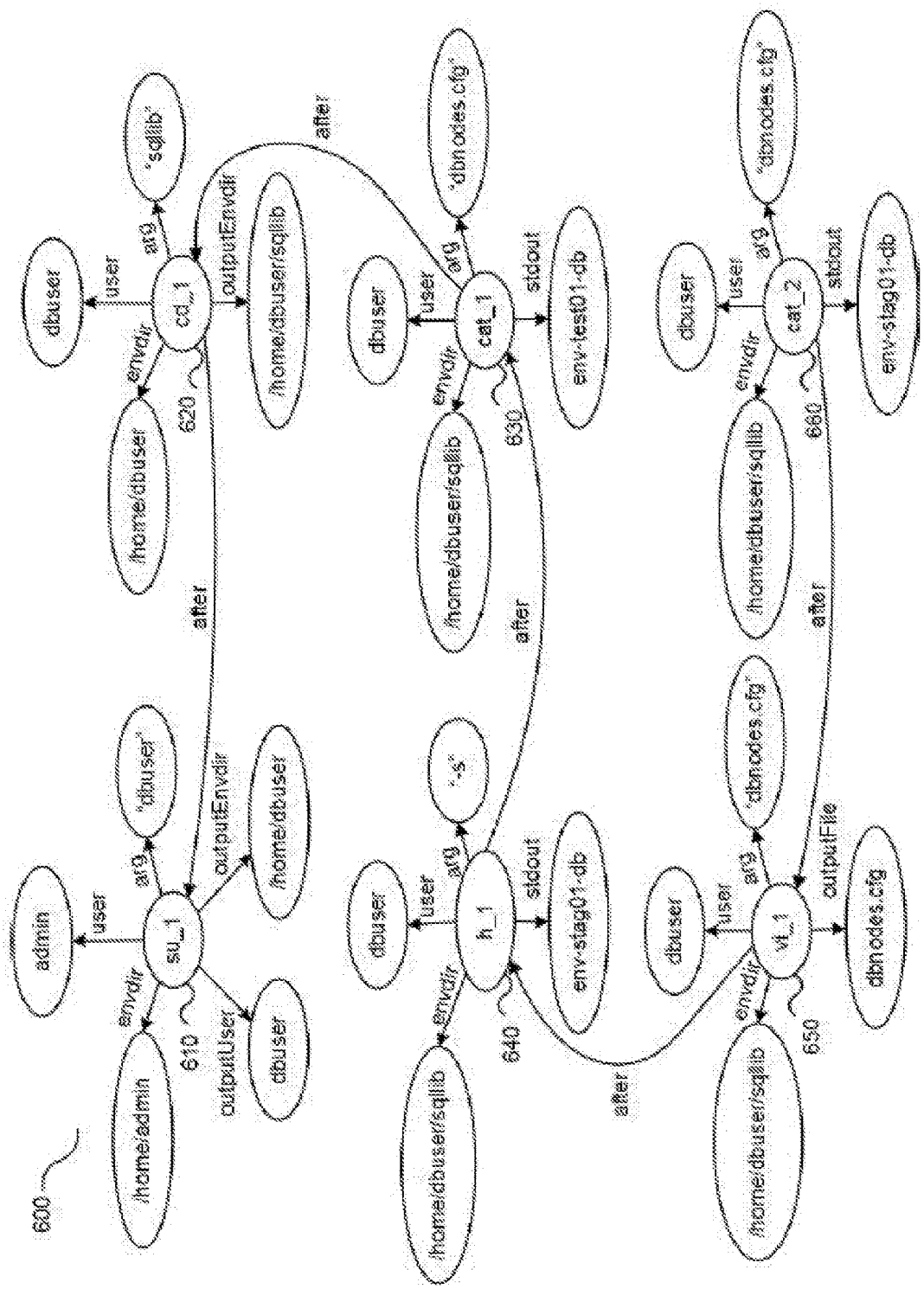
FIG. 6 shows an exemplary semantic model corresponding to an exemplary set of commands according to an embodiment of the present invention.

FIG. 6 shows a semantic model 600 comprising a plurality of nodes and relationships between the nodes corresponding to the above set of commands and the contexts thereof. In an embodiment of the invention, the nodes and relationships in FIG. 6 may be generated by the semantic creator 530 in FIG. 5.

The command node 610 corresponds to the command "su" in line 1 of the above command set and is linked to five context nodes. The identifier of the command node 610 is "su_1", and the content of the command node 610 is "su" (not shown in the figure). It should be noted that any kind of identifier can be used for the command, not limited to the example "su_1". In the below descriptions, the identifier of command node is also used to refer to the corresponding command for simplicity. The five context nodes are shown as around node 610 and labeled with their contents, and their relationships with node 610 are denoted by the respective arrows, representing the contexts of execution of the command "su_1". The upper context nodes "admin", "/home/admin" and "dbuser" and their relationships with node 610 represent that "su_1" is run by the current user "admin", has an environmental directory "/home/admin" and has an argument "dbuser", respectively. The lower context nodes "dbuser" and "/home/dbuser" and their relationships with node 610 represent that the command "su_1" changes the current user who runs the command to a user "dbuser" and outputs an environmental directory "/home/dbuser", respectively. It should be noted that, although FIG. 6 only shows the contents of the context nodes, each context node may have an identifier represented by a variable.

Similarly, the command node 620 corresponds to the command "cd" in line 2. The identifier of the command node 620 is "cd_1", and the content of the command node 620 is "cd" (not shown in the figure). The context nodes "dbuser", "/home/dbuser" and "sqllib" represent the current user, the environmental directory and the argument of "cd_1", respectively, and the context node "/home/dbuser/sqllib" represents the environmental directory output by the command "cd_1".

The command node 630 corresponds to the command "cat" in line 3. The identifier of the command node 630 is "cat_1", and the content of the command node 630 is "cat"

(not shown in the figure). The context nodes "dbuser", "/home/dbuser/sqllib" and "dbnodes.cfg" represent the current user, the environmental directory and the argument of "cat_1", respectively, and the context node "env-test01-db" represents the standard output of the command "cat_1".

The command node 640 corresponds to the command "hostname" in line 5. The identifier of the command node 640 is "h_1", and the content of the command node 640 is "hostname" (not shown in the figure). The context nodes "dbuser", "/home/dbuser/sqllib" and "-s" represent the current user, the environmental directory and the argument of "h_1", respectively, and the context node "env-stag01-db" represents the standard output of the command "h_1".

The command node 650 corresponds to the command "vi" in line 7. The identifier of the command node 650 is "vi_1", and the content of the command node 650 is "vi" (not shown in the figure). The context nodes "dbuser", "/home/dbuser/sqllib" and the right context node "dbnodes.cfg" represent the current user, the environmental directory and the argument of "vi_1", respectively, and the lower context node "dbnodes.cfg" represents the output file of the command "vi_1".

The command node 660 corresponds to the command "cat" in line 8. The identifier of the command node 660 is "cat_2", and the content of the command node 660 is "cat" (not shown in the figure). The context nodes "dbuser", "/home/dbuser/sqllib" and "dbnodes.cfg" represent the current user, the environmental directory and the argument of "cat_2", respectively, and the context node "env-stag01-db" represents the standard output of the command "cat_2".

The direct "after" relationships between the command nodes are also shown in FIG. 6 by the arrows denoted with "after". In particular, there are five direct "after" relationships in FIG. 6, including (cs_1 after su_1), (cat_1 after cd_1), (h_1 after cat_1), (vi_1 after h_1), and (cat_2 after vi_1).

Figure 7:
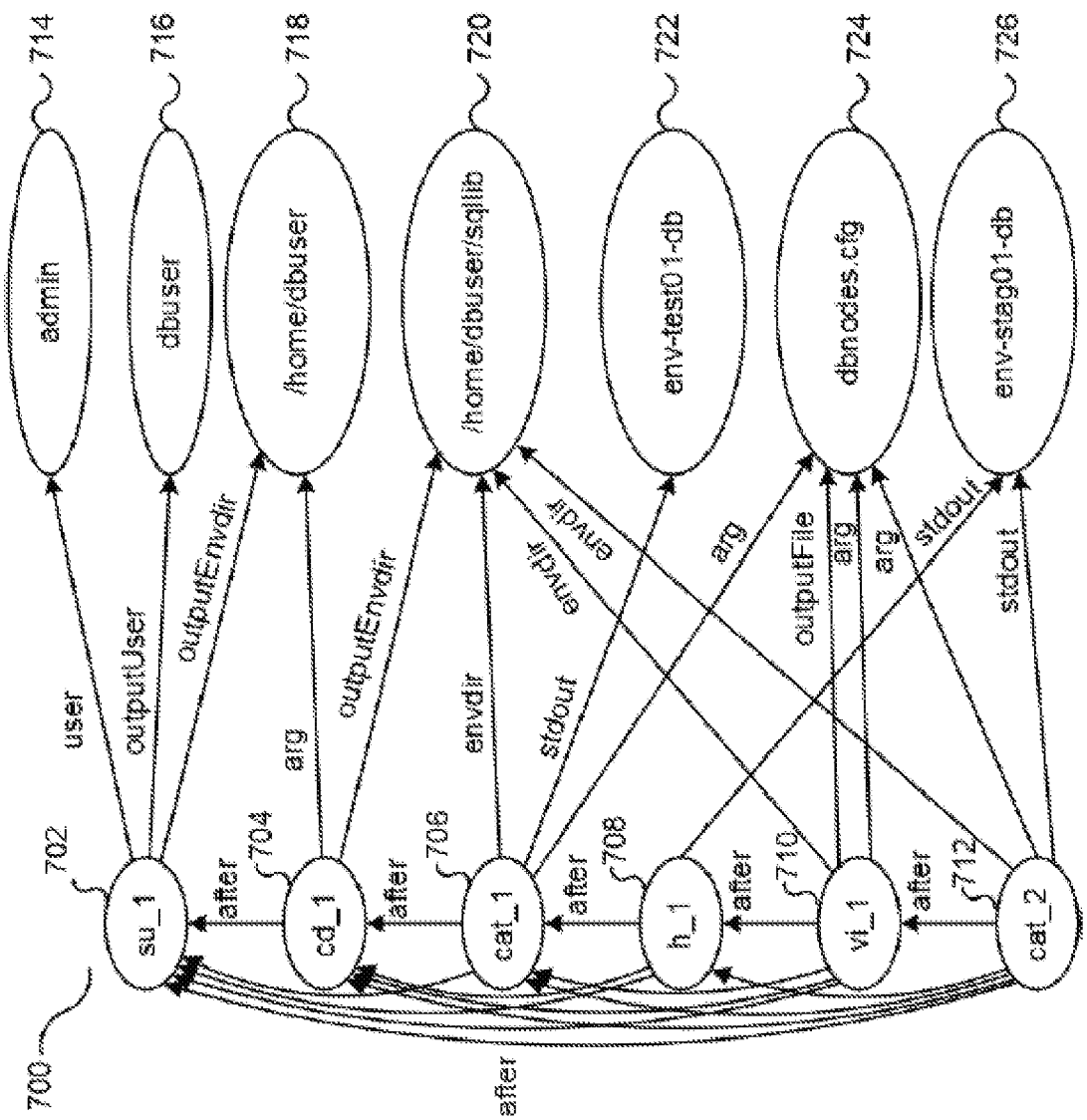
FIG. 7 shows another exemplary semantic model corresponding to the exemplary set of commands according to an embodiment of the present invention.

FIG. 7 shows an exemplary semantic model 700 modified based on the semantic model 600 according to an embodiment of the invention. The semantic model 700 may be obtained by determining the indirect "after" relationships between the command nodes and combining the context nodes having the same content in FIG. 6. For simplicity, some context nodes in FIG. 6 are not shown in FIG. 7. The semantic model 700 may also be generated by the semantic creator 530 in FIG. 5.

In the semantic model 700, the combined context node 718 is the environmental directory output by the node "su_1" 702 and is also the argument of the node "cd_1" 704. The combined context node 720 is the environmental directory output by "cd_1" 704 and is also the environmental directory of "cat_1" 706, "vi_1" 710 and "cat_2" 712. The combined context node 724 is the output file of "vi_1" 710 and is also the argument of "cat_1" 706, "vi_1" 710 and "cat_2" 712. The combined context node 726 is the standard output of "h_1" and also the standard output of "cat_2". The arrows between the command nodes "su_1" 702, "cd_1" 704, "cat_1" 706, "h_1" 708, "vi_1" 710 and "cat_2" 712 represent the complete sequential dependencies between the nodes, including both direct "after" relationships and indirect "after" relationships. The indirect "after" relationships can be derived from the direct "after" relationships. As an example, (su_1 after cat_1) can be derived from (su_1 after cd_1) and (cd_1 after cat_1).

The semantic model 700 can be compared with one or more predetermined intention schemas. An example of the intention schema is shown as follows, which is written in SparQL (Simple Protocol and RDF (Resource Description Framework) Query Language):

```
1: ?cd_1 isa cd
2: ?cd_1 envdir $dirName0
3: ?cd_1 outputEnvdir $dirName
4: ?cat_1 isa cat
5: ?cat_1 envdir $dirName
6: ?cat_1 arg ?fileName
7: ?cat_1 stdout ?cat1out
8: ?cat_2 isa cat
9: ?cat_2 envdir $dirName
10: ?cat_2 arg ?fileName
11: ?cat_2 stdout ?cat2out
12: ?h_1 isa hostname
13: ?h_1 arg "-s"
14: ?h_1 stdout ?sHostname
15: ?vi_1 isa vi
16: ?vi_1 envdir $dirName
17: ?vi_1 arg ?fileName
18: ?vi_1 outputFile ?fileName
19: ?vi_1 after ?cat_1
20: ?cat_2 after ?vi_1
21: ?vi_1 after ?h_1
22: contains(?cat2out, ?sHostname)
23: !contains(?cat1out, ?sHostname)
```

In the above schema, "!" or "$" is used as a prefix for a variable. As shown above, the intention schema may contain a number of lines, and each line may represent a specific rule. Lines 1-3 require that a command denoted by the variable "?cd_1" is a "cd" command, has an environmental directory "$dirName0" and has an output environmental directory "$dirName". Lines 4-7 require that a command denoted by the variable "?cat_1" is a "cat" command and has an environmental directory "$dirName", an argument "?fileName" and a standard output "?cat1out". Lines 8-11 require that another command denoted by the variable "?cat_2" is a "cat" command and has an environmental directory "$dirName", an argument "?fileName" and a standard output "?cat2out". Lines 12-14 require that a command denoted by the variable "?h_1" is a "hostname" command and has an argument "-s" and a standard output "?sHostname". Lines 15-18 require that a command denoted by the variable "?vi_1" is a "vi" command and has an environmental directory "$dirName", an argument "?fileName" and an output file "?fileName". Lines 19-21 require that the command "?vi_1" is executed after the command "?cat_1", the command "?cat_2" is executed after the command "?vi_1" and the command "?vi_1" is executed after the command "?h_1". Line 22 requires that "?cat2out" contains "?sHostname", and line 23 requires that "?cat1out" does not contain "?sHostname". It should be noted that although the above intention schema is written in SparQL as an example, any appropriate language can be used to describe an intention schema.

In brief, this intention schema mainly includes rules to determine whether the semantic model comprises a "cd" command, a "vi" command, a "hostname" command and two "cat" commands, whether the commands satisfy certain sequential dependencies, whether a "vi" command is used to edit the output file of the first "cat" command, whether the output of the second "cat" command contains the output of the "hostname" command while the output of the first "cat" command does not contain the output of the "hostname" command, and so on. With these rules, this intention schema may indicate an intention of adapting a configuration file to the current hostname.

After comparing the semantic model 700 with the above intention schema, it can be determined, e.g. by the intention detector 540, that the command nodes 704, 706, 708, 710, 712, the context nodes 718, 720, 722, 724, 726 and their relationships match the intention schema. Accordingly, it can be determined that the corresponding set of commands has the intention of adapting a configuration file to the current hostname. It should be noted that, the semantic model 600 may also be used to compare with an intention schema to determine the intention of the command set, although the intention schema for the model 600 may be a little different (usually more complicated) than that for the model 700.

An optimized set of commands associated with the above intention schema is as follows, which may be predetermined and stored in association with the intention schema.

1: sHostname='hostname -s'
2: cat1out='cat${dirName}${fileName}'
3: sed -i "s\b$cat1out\b/$sHostname/"${dirName}${fileName}

Line 1 denotes querying the short hostname and assigning its value to the variable "sHostname", line 2 denotes viewing the file "${dirName}${fileName}" and assigning its content to the variable "$cat1out", and line 3 denotes replacing the value of "$cat1out" in the file "${dirName}${fileName}" with the value of "sHostname". It can be seen that, as compared with the original set of commands, the vi command is not used anymore and thus the manual editing of the configuration file is avoided.

Figure 8:
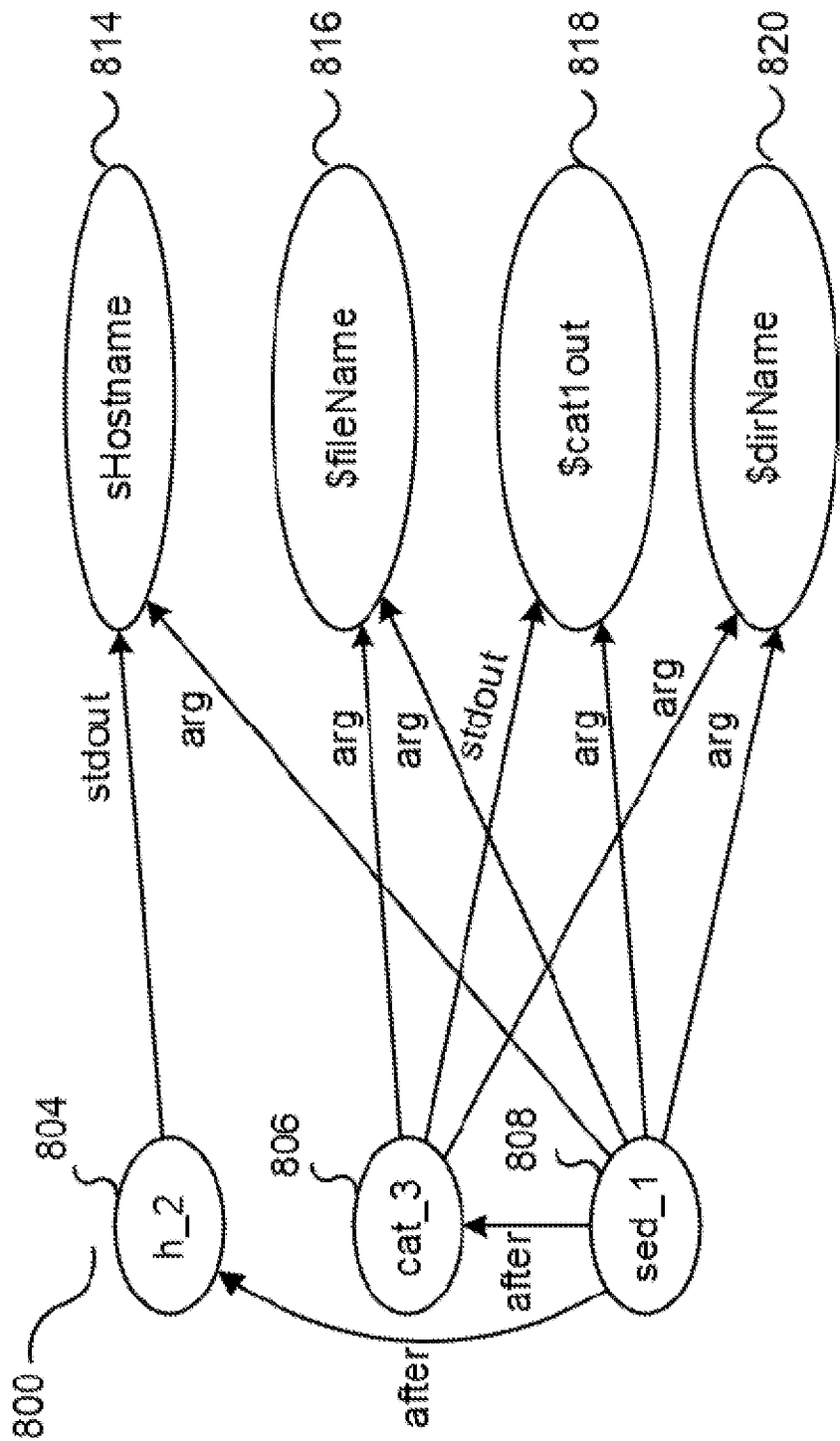
FIG. 8 shows an exemplary semantic sub-model associated with an intention schema according to an embodiment of the present invention.

FIG. 8 shows an exemplary optimized semantic sub-model 800 associated with the above intention schema and corresponding to the above optimized set of commands. In the optimized semantic sub-model 800, command node 804 corresponds to the command "hostname" in line 1 of the above optimized command set. The identifier of the command node 804 is "h_2", and the content of the command node 804 is "hostname" (not shown in the figure). Command node 806 corresponds to the command "cat" in line 2. The identifier of the command node 806 is "cat_3", and the content of the command node 806 is "cat" (not shown in the figure). Command node 808 corresponds to the command "sed" in line 3. The identifier of the command node 808 is "sed_1", and the content of the command node 808 is "sed" (not shown in the figure). There is an "after" relationship between node 804 and node 808, and another "after" relationship between node 806 and node 808. The semantic sub-model 800 further comprises context nodes 814, 816, 818 and 820 and their relationships with the command nodes, indicated by arrows, representing the contexts of execution of the corresponding commands, such as the arguments and the standard outputs of the commands.

Figure 9:
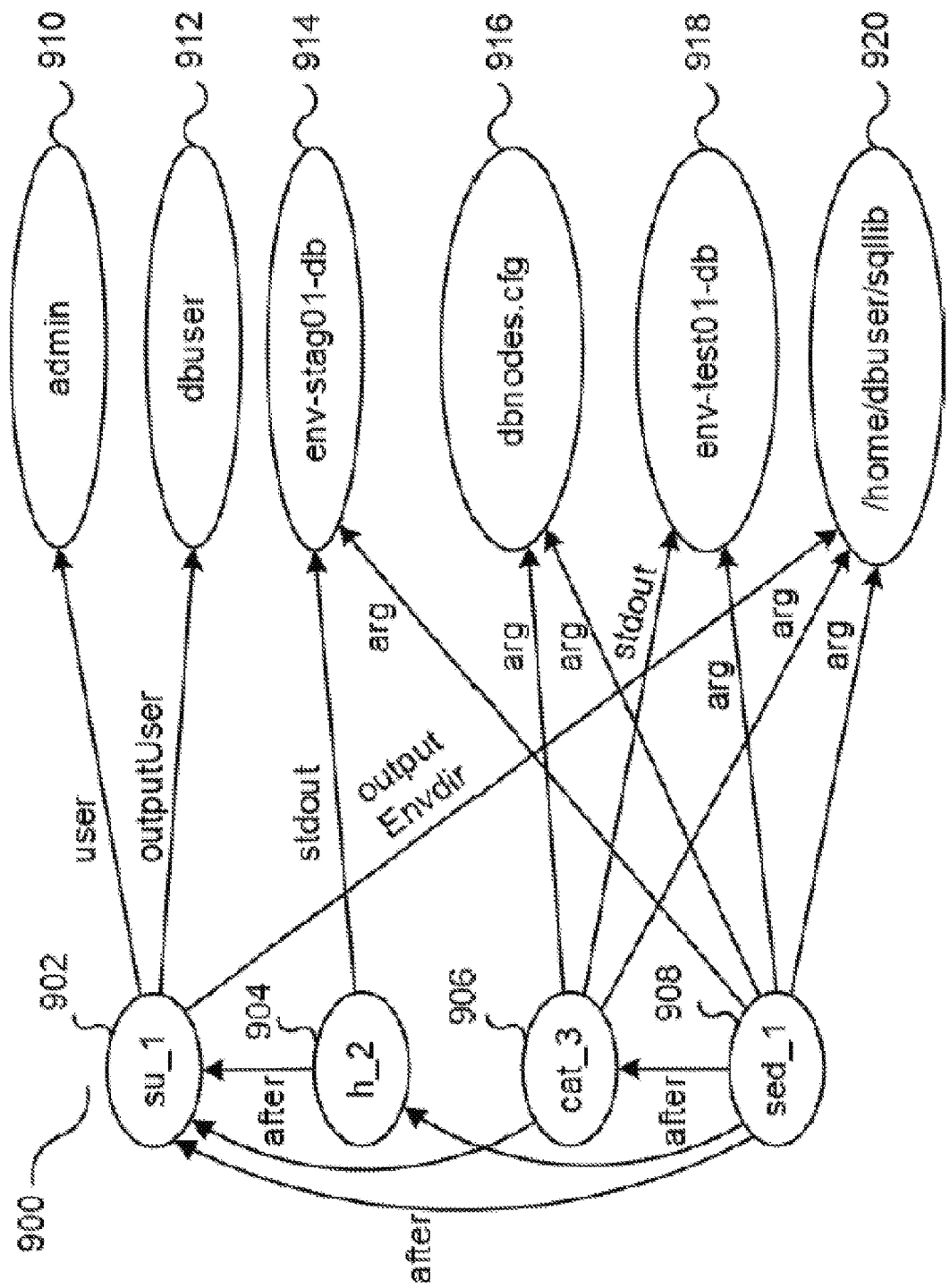
FIG. 9 shows an exemplary updated semantic model according to an embodiment of the present invention.

FIG. 9 shows an exemplary semantic model 900 that is updated from the semantic model 700 using the semantic sub-model 800. In particular, the nodes 704, 706, 708, 710, 712, 718, 720, 722, 724 and 726 and their relationships in the semantic model 700 are replaced with the nodes and relationships in the semantic sub-model 800. Further, based on the intention schema, contents of the context nodes 726, 724, 722, 720 are assigned to the variables of the context nodes 814, 816, 818 and 820 in the semantic model 800, respectively, such that sHostname=env-stag01-db, $fileName=dbnodes.cfg, $cat1out=env-test01-db, and $dirName=/home/dbuser/sqllib. In this way, an updated semantic model 900 can be obtained.

The updated set of commands corresponding to the updated semantic model 900 may be as follows:

1: su-dbuser
2: sHostname='hostname -s'
3: cat1out='cat/home/dbuser/sqllib/dbnodes.cfg'
4: sed -i "s\b$cat1out\b/$sHostname/"/home/dbuser/sqllib/dbnodes.cfg Line 1 denotes switching the current user (e.g., "admin") to "dbuser" and switching the working environment accordingly, line 2 denotes querying the short hostname and assigning its value to the variable "sHostname", line 3 denotes viewing the file "/home/dbuser/sqllib/dbnodes.cfg" and assigning its content to the variable "cat1out", and line 4 denotes replacing the value of "cat1out" in the file "/home/dbuser/sqllib/dbnodes.cfg" with the value of "sHostname". As mentioned with reference to FIG. 4, the updated set of commands may be generated as a script (e.g., an automation script).

It can be seen that, the above updated set of commands and the original set of commands can both change the content of the file "/home/dbuser/sqllib/dbnodes.cfg" according to the current hostname, but the original set of commands contains six commands while the above updated set of commands only contains four commands. Therefore, the updated set of commands is more concise and efficient. Moreover, in the updated set of commands, there is no need to manually edit the configuration file. It should be noted that, the updated command set may be better than the original command set in various aspects, not limited to those in the above example. For example, in the updated command set, the useless or read-only commands in the original command set may have been deleted and the wrong or insecure commands may have been corrected.

The present invention may be a system, a method, and/or a computer program product at any possible technical detail level of integration. The computer program product may include a computer readable storage medium (or media) having computer readable program instructions thereon for causing a processor to carry out aspects of the present invention.

According to an embodiment, the method according to embodiments of the present invention can be implemented as a service in a cloud environment.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method for command optimization, comprising:
    detecting, by one or more processors, an intention of a set of commands based on a semantic model, wherein the semantic model represents the set of commands and contexts of execution of the set of commands, wherein the semantic model comprises a plurality of nodes and relationships between the nodes, the plurality of nodes comprising command nodes and context nodes, wherein:
    a command node corresponds to a command in the set of commands,
    a context node and its relationship with the command node represents a context of execution of the command corresponding to the command node, and
    a relationship between the command nodes represents a sequential dependency between the commands corresponding to the command nodes, and wherein detecting the intention of the set of commands comprises determining that at least part of the nodes and their relationships in the semantic model match a predetermined intention schema corresponding to the intention, wherein an intention schema library includes a plurality of intention schemas that correspond to a plurality of intentions;

obtaining a predetermined semantic sub-model associated with the intention;

updating, by the one or more processors, the semantic model with the predetermined semantic sub-model by replacing the matched nodes and their relationships in the semantic model with nodes and relationships in the predetermined semantic sub-model;

iteratively performing the detecting and the updating until the updated semantic model does not match any intention schema in the intention schema library; and generating, by the one or more processors, a script of commands based on the updated semantic model.

2. The method of claim 1, wherein the semantic model is represented by a plurality of triples, each triple comprising two nodes and a relationship between them.

3. The method of claim 1, further comprising establishing the semantic model, wherein the establishing the semantic model comprises:

translating, by the one or more processors, each command in the set of commands and contexts of execution of the command into a command node, one or more context nodes and relationships between the command node and the context nodes; and determining, by the one or more processors, the relationships between the command nodes based on an execution sequence of the set of commands.

4. The method of claim 3, wherein establishing the semantic model further comprises:

combining, by the one or more processors, context nodes having the same content.

5. The method of claim 1, further comprising:

outputting, by the one or more processors, an alert in response to detecting the intention that does not comply with a predetermined security standard.

6. The method of claim 1, wherein the contexts of execution of a command includes at least one of: syntax of the command, input of the command, output of the command, environment variables of the command, arguments of the command, exit code of the command, a user running the command, file changed by the command, process changed by the command or environment variables changed by the command.

7. A computing system for command optimization, comprising:

one or more processors;

a computer-readable memory unit coupled to the one or more processors, the memory unit comprising instructions that, when executed by the one or more processors, perform actions of:

detecting, by one or more processors, an intention of a set of commands based on a semantic model, wherein the semantic model represents the set of commands and contexts of execution of the set of commands, wherein the semantic model comprises a plurality of nodes and relationships between the nodes, the plurality of nodes comprising command nodes and context nodes, wherein:

a command node corresponds to a command in the set of commands, a context node and its relationship with the command node represents a context of execution of the command corresponding to the command node, and a relationship between the command nodes represents a sequential dependency between the commands corresponding to the command nodes, and wherein detecting the intention of the set of commands comprises determining that at least part of the nodes and their relationships in the semantic model match a predetermined intention schema corresponding to the intention, wherein an intention schema library includes a plurality of intention schemas that correspond to a plurality of intentions;

obtaining a predetermined semantic sub-model associated with the intention;

updating, by the one or more processors, the semantic model with the predetermined semantic sub-model by replacing the matched nodes and their relationships in the semantic model with nodes and relationships in the predetermined semantic sub-model;

iteratively performing the detecting and the updating until the updated semantic model does not match any intention schema in the intention schema library; and generating, by the one or more processors, a script of commands based on the updated semantic model.

8. The computing system of claim 7, wherein the memory unit further comprises instructions that, when executed by the one or more processors, establish the semantic model, wherein the establishing the semantic model comprises:

translating each command in the set of commands and contexts of execution of the command into a command node, one or more context nodes and relationships between the command node and the context nodes; and determining the relationships between the command nodes based on an execution sequence of the set of commands.

9. The computing system of claim 8, wherein establishing the semantic model further comprises:

combining context nodes having the same content.

10. The computing system of claim 7, wherein the memory unit further comprises instructions that, when executed by the one or more processors, output an alert in response to detecting an intention that does not comply with a predetermined security standard.

11. A computer program product for command optimization, comprising a computer readable storage medium having program instructions embodied therewith, the program instructions executable by one or more processors to cause the one or more processors to perform actions of:

detecting, by one or more processors, an intention of a set of commands based on a semantic model, wherein the semantic model represents the set of commands and contexts of execution of the set of commands, wherein the semantic model comprises a plurality of nodes and relationships between the nodes, the plurality of nodes comprising command nodes and context nodes, wherein:

a command node corresponds to a command in the set of commands, a context node and its relationship with the command node represents a context of execution of the command corresponding to the command node, and a relationship between the command nodes represents a sequential dependency between the commands corresponding to the command nodes, and wherein detecting the intention of the set of commands comprises determining that at least part of the nodes and their relationships in the semantic model match a predetermined intention schema corresponding to the intention, wherein an intention schema library includes a plurality of intention schemas that correspond to a plurality of intentions;

obtaining a predetermined semantic sub-model associated with the intention;

updating, by the one or more processors, the semantic model with the predetermined semantic sub-model by replacing the matched nodes and their relationships in the semantic model with nodes and relationships in the predetermined semantic sub-model;

iteratively performing the detecting and the updating until the updated semantic model does not match any intention schema in the intention schema library; and generating, by the one or more processors, a script of commands based on the updated semantic model.

12. The computer program product of claim 11, wherein the program instructions executable by the one or more processors further cause the one or more processors to establish the semantic model, wherein the establishing the semantic model comprises:

translating each command in the set of commands and contexts of execution of the command into a command node, one or more context nodes and relationships between the command node and the context nodes; and determining the relationships between the command nodes based on an execution sequence of the set of commands.

13. The computer program product of claim 12, wherein establishing the semantic model further comprises:

combining context nodes having the same content.

* * * * *